United States Patent
Trossen et al.

(10) Patent No.: US 6,233,241 B1
(45) Date of Patent: May 15, 2001

(54) HIERARCHICAL TRANSMISSION SYSTEM WITH DISTRIBUTED STORAGE OF RESOURCE PATH INFORMATION AMONG NETWORK ELEMENTS OF THE SYSTEM

(75) Inventors: Dirk Trossen; Tobias Helbig, both of Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/057,102

(22) Filed: Apr. 8, 1998

(30) Foreign Application Priority Data

Apr. 14, 1997 (DE) .............................................. 197 15 396

(51) Int. Cl.$^7$ .................................................... H04L 12/44
(52) U.S. Cl. .......................................... 370/408; 709/252
(58) Field of Search ..................................... 370/400, 408, 370/351, 254; 709/252, 201, 202

(56) References Cited

U.S. PATENT DOCUMENTS

| | | | |
|---|---|---|---|
| 4,885,742 | * 12/1989 | Yano | 370/408 |
| 5,537,394 | * 7/1996 | Abe et al. | 370/252 |
| 5,539,883 | * 7/1996 | Allon et al. | 709/105 |
| 5,612,959 | * 3/1997 | Takase et al. | 370/390 |

OTHER PUBLICATIONS

"A Primer on the T. 120 Standard", DataBeam, 1995, p. 5.

* cited by examiner

Primary Examiner—Hassan Kizou
Assistant Examiner—Imder Mehra

(57) ABSTRACT

A transmission system having a plurality of network elements arranged in a tree-like hierarchical structure, and which includes means for the management and allocation of resources to the network elements. Such a system may be a communication and data transmission network consisting of a plurality of users having distributed databases. In order to enhance the efficiency and transmission speed in such a transmission system, according to the invention network elements which are situated along a resource path (P) store only the course of such resource path, but not the possessors and states of resources in lower hierarchical levels of the system.

5 Claims, 1 Drawing Sheet

HIERARCHICAL TRANSMISSION SYSTEM WITH DISTRIBUTED STORAGE OF RESOURCE PATH INFORMATION AMONG NETWORK ELEMENTS OF THE SYSTEM

BACKGROUND OF THE INVENTION

1. Field of the Invention

The invention relates to a transmission system which comprises a plurality of network elements which are arranged in a hierarchical, tree-like structure, and means for the management and allocation of resources to a network element.

2. Description of the Related Art

Such a transmission system is known from the publication "A primer on the T.120 Standard", DataBeam, 1995, P.5.

A transmission system of this kind is used, for example for communication and data transmission in a network consisting of a plurality of users and/or in distributed data bases. The management of resources in such distributed environments, i.e. the management, allocation and blocking of resources, is a decisive factor in respect of the speed and efficiency of a transmission system. Resources are, for example permissions which are available in the transmission system, for example the permission to speak in a communication system or the permission to use an arbitrary system element. A given quality of service may also be considered as a resource.

The infrastructure of known distributed transmission systems is organized in a hierarchical and tree-like manner. Starting from a main network element, in which the so-called top provider is localized, connections can be established with further network elements which are arranged at lower hierarchical levels. Network elements in which so-called providers are located offer, in addition to other services, the functionality for the management of resources in the transmission system. A network element can claim a resource as soon as a connection has been established between this element and the network element managing the resource. The path through the tree structure thus formed, extending from a first network element which manages a resource to a second network element which claims the resource offered, is referred to as a resource path.

The allocation and the possession of a resource can be described in abstract terms as the allocation and the possession of a token. In known transmission systems the number of a token and the possessor are stored by appropriate means in the transmission system. In the case of distributed storage, storage takes place in each network element. A change of the state of a resource, i.e. when the possessor of a token changes, when a token is released or surrendered, may cause a plurality of updating messages between all network elements and could lead to a different state of the information in different network elements. Central storage of the information, however, has the drawback that each information concerning a resource, for example the requesting of a resource, must be addressed to the top provider and possibly transported further to the central storage element arranged in a different location. In large transmission systems this leads to very long response times for a resource request and overall to a reduction of the efficiency of the transmission system.

SUMMARY OF THE INVENTION

Therefore, it is an object of the invention to enhance the efficiency and the transmission speed of a transmission system of the aforesaid kind and to simplify the resource management.

This object is achieved according to the invention in that network elements which are arranged along a resource path, extending from a first network element to a second network element, include means for storing the course of the resource path.

As opposed to known transmission systems, not the possessor (the network element) of a resource itself is stored in the network elements along a resource path, but only an indication as to in which branch of the next lower hierarchical level there can be found the network element whereto a resource is allocated, i.e. in which branch the resource path extends. A central database in which the states and the possessors of all resources are stored can either be completely dispensed with or it may have a simpler construction, since the path to the network element whereto the resource is allocated can be found via the information stored in the network elements along a resource path. The request for a resource can thus be quickly answered, since this request need not be applied to and answered by a central database in all cases, but only need be transported as far as a network element having enough information concerning the state of the requested resource. Moreover, the information concerning the change of state of a resource need only be applied to the network elements along the resource path and possibly also to the central storage element, but not to all other network elements. Ultimately this results in a higher efficiency and an increased speed of the transmission system. In a further embodiment of the invention, the network elements along the resource path include a respective database in which the states of the resources in the branches, emanating therefrom, of the lower hierarchical levels are stored. When a network element requests a resource allocated to a network element in a neighboring branch (a branch which emanates from the same network element as the branch in which the requesting network element is situated), the request can be readily answered, without it being necessary to involve a central database or the top provider.

The invention is used in transmission systems, for example in multipoint communication systems, in which a plurality of communication stations are arranged in a hierarchical network and a transmitter can communicate with a plurality of receivers. In that case the resources managed are, for example transmission channels.

The invention also relates to a network element and to a resource management system. The resource management system is preferably arranged so as to be distributed between a plurality of network elements, via the transmission system.

The invention also relates to a storage medium for use in a resource management system, such as notably a CD-ROM, a floppy disk, a hard disk or another storage device.

BRIEF DESCRIPTION OF THE DRAWINGS

The invention will be described in detail hereinafter with reference to the drawings. Therein.

DESCRIPTION OF THE PREFERRED EMBODIMENTS

Figure 1:
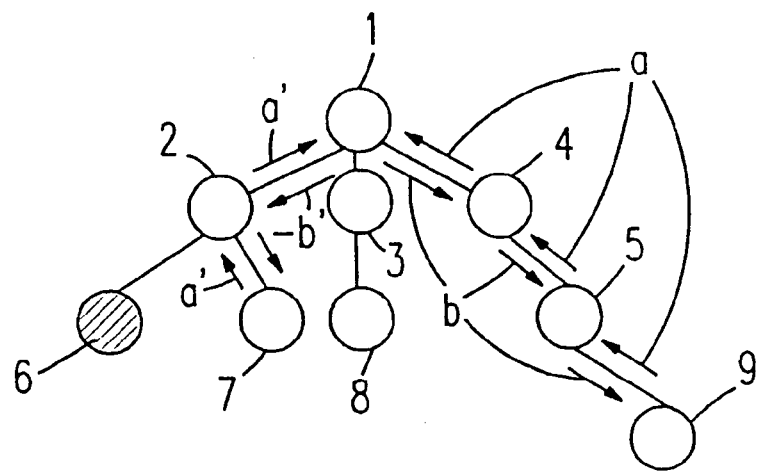
FIG. 1 illustrates how resource management is carried out in a known transmission system.

FIG. 1 shows a transmission system with a network with a tree-like hierarchical structure. In the top position there is located the top provider 1 which communicates with network elements (providers) 2, 3, 4 arranged at the next lower hierarchical level. With the individual network elements 2, 3, 4 at the next lower hierarchical level, and in one case at an even lower hierarchical level, there are associated one or more network elements 5, 6, 7, 8, 9. For the sake of simplicity, FIG. 1 shows only a simple structure; a real transmission system may be arbitrarily larger and more complex.

When the network element 9 requests a resource which has been allocated to the network element 6 at that instant, in the known transmission system, involving central resource management, the request is supplied (symbolically represented by arrows (a) to the top provider 1, which stores the information concerning the state and the possessor of the resource; this information is returned to the network element 9 as an answer (arrows (b). When the network element 7 requests a resource allocated to the network element 6, this request is also transported to the top provider 1 (arrows a') and answered thereby (arrows b').

By way of illustration, the transmission system shown in FIG. 1 can be seen as a communication system between a plurality of users (network elements) in which always only one person can speak at a time. The permission to speak represents a resource which is allocated exclusively to the speaker. When a person receives the permission to speak, the associated network element receives a token so as to indicate the permission to speak. If another person wishes to speak, first the instantaneous possessor of the token must be found out in the top provider so as to request the permission to speak therefrom. Subsequently, the token is passed on to the new speaker who thus receives the permission to speak.

The management of resources according to the invention will be described in detail with reference to FIG. 2. Initially, a resource is allocated exclusively to the network element 6. A database in the top provider 1 stores the information that this resource has been allocated to a network element in the left-hand branch, so that it is not freely available. The possessor of the resource, i.e. the indication or number thereof, is not stored in the database. A database in the network element 2 stores the information that this resource has been allocated to a network element in the left branch. Because the network element 6 is situated at the lowest hierarchical level, along the resource path P extending from the network element 1, via the network element 2, to the network element 6, i.e. the path comprising the connections from the network element 1 to the network element 2 and further to the network element 6, the possessor of the resource can be identified by way of the information in the databases of the network elements 1 and 2. Additionally, the network element 6 may also store the information that the network element 6 is the possessor of the resource.

When the network element 7 requests the resource, this request need be transported only as far as the network element 2 (arrow c), because that element already contains sufficient information for determining the possessor of the resource and hence the request can be answered (arrow d). Thus, when the resource is released by the network element 6 and allocated to the network element 7, the state of the resource does not change and the database of the top provider 1 need not be updated either, because the entry made thus far for the resource ("allocated in the left-hand branch") is still valid. Even when the resource were not exclusively allocated, i.e. when it were allocated to a plurality of network elements at the same time, for example the two network elements 6 and 7, it would not be necessary to update the data base of the top provider 1 but only the database of the network element 2.

Figure 2:
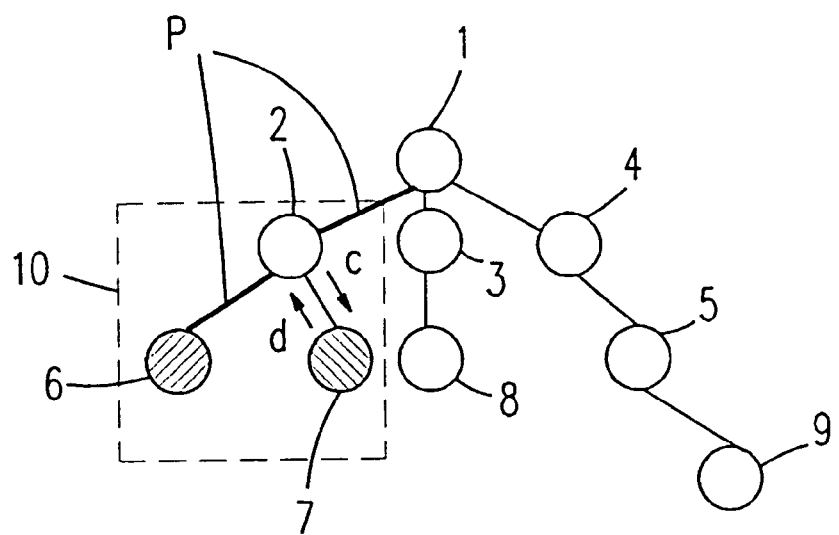
FIG. 2 illustrates how resource management is carried out in a transmission system according to the invention.

The overall structure shown in FIG. 2 is also referred to as a domain which can be subdivided into further sub-domains, for example the resource sub-domain 10 which includes the network elements 2, 6 and 7. The main network element 2 of such a sub-domain 10 is also referred to as a resource top provider. For as long as the possession of a resource changes only within a sub-domain, therefore, there will be no changes of state outside the sub-domain; these changes of possession are not directly visible outside the sub-domain.

When the network element 9 wishes to know the state of the resource allocated to the network element 6, this information can be requested from the top provider 1 in which the state of the resource is stored. When the network element 9 requests this resource, the request is transported to the network element 6 via the top provider 1; the path to the network element 6 is found by means of the information stored in the network elements 1, 2 along the resource path P.

By way of illustration, the network elements 2, 6, 7 may symbolize computers which are located in the United States of America, whereas all other network elements symbolize computers which are located in Europe. The network elements 6 and 7 involve communication partners who speak alternately, whereas passive listening communication partners are present at all other network elements. A token, representing the permission to speak, is passed to and from between the network elements 6 and 7, so only within the USA. The management information involved need only be applied to the network element 2, so that it is locally limited to the computers present in the USA. The management information need not be applied to the computers located in Europe, so that the management is faster and less expensive.

The invention offers shorter response times in the event of resource requests in transmission systems having a network with a hierarchical and tree-like structure. The transmission system loading due to the establishment of connections, the loading of transmission paths and the updating of databases can also be reduced by the invention, resulting in a higher efficiency of the transmission system overall. The invention can be used, for example in communication systems. An example of a communication service is a standard defined in the ITU-T T.120 standard series. This communication service offers transmission channels and tokens, as described above, as resources within a hierarchical structure. The management of the resources is implemented at a central database located in the top provider of the structure.

What is claimed is:

1. A transmission system comprising a plurality of network elements which are arranged in a tree-like hierarchical structure, the network elements including means for management and allocation of resources in said system; and wherein network elements which are arranged along a resource path (P) extending from one network element to another include means for storing information describing the course of said resource path (P) in relation to said hierarchical structure.

2. A transmission system as claimed in claim 1, wherein the network elements along the resource path (P) each include a respective database which stores information as to in which branch of the next lower hierarchical structure level the resource path (P) extends.

3. A transmission system as claimed in claim 1, wherein the network elements along the resource path (P) each include a respective database which stores the states of resources in network branches, emanating therefrom, of the next lower hierarchical level.

4. A network element for use in a transmission system which comprises a plurality of network elements arranged in a tree-like hierarchical structure including means for management and allocation of resources in said system; wherein a network element which is along a resource path (P) extending from one network element to another includes means for storing information describing the course of said resource paths (P) in relation to said hierarchical structure.

5. A resource management system for management and allocation of resources to network elements in a transmission system which comprises a plurality of network elements arranged in a tree-like hierarchical structure; wherein network elements which are arranged along a resource path (P) extending from one network element to another include means for storing information describing the course of said resource path (P) in relation to said hierarchical structure.

* * * * *